United States Patent [19]
Liao

[11] Patent Number: 5,213,006
[45] Date of Patent: May 25, 1993

[54] BICYCLE STEM MECHANISM HAVING INTERNAL RIGIDIFYING WASHER

[75] Inventor: Jim Liao, Taipei Hsien, Taiwan

[73] Assignee: Hsin Lung Accessories Co., Ltd., Taiwan

[21] Appl. No.: 894,444

[22] Filed: Jun. 5, 1992

[51] Int. Cl.$^5$ .............................................. B62H 5/04
[52] U.S. Cl. ................................... 74/551.1; 74/492; 403/374
[58] Field of Search ...................... 74/492, 493, 551.1, 74/551.2, 551.3, 551.4; 403/104, 374

[56] References Cited

U.S. PATENT DOCUMENTS

| | | | |
|---|---|---|---|
| 3,787,126 | 1/1974 | Arlen | 403/104 O |
| 4,095,911 | 6/1978 | Lacroix | 403/374 X |
| 4,167,352 | 9/1979 | Pletscher | 403/374 X |
| 4,916,970 | 4/1990 | McMurtrey | 74/551.1 O |
| 5,085,063 | 2/1992 | Van Dyke et al. | 403/374 X |
| 5,090,924 | 2/1992 | Pfaller et al. | 403/374 X |

Primary Examiner—Leslie A. Braun
Assistant Examiner—Daniel Wittels
Attorney, Agent, or Firm—Andrus, Sceales, Starke & Sawall

[57] ABSTRACT

An improved stem mechanism, comprises a vertical bar having an upper portion and a inclined lower portion, the inclined lower portion is capable of being inserted into a fork member and with an annular portion at its inclined lower end; a bar member, angularly connected to the upper portion of the vertical bar; a securing member with an inclined upper end and with an annular portion thereon, the securing members is capable of being engaged firmly within the fork member and having a threaded passage in its lower end; and a bolt member having a threaded portion, which can be inserted into the vertical bar and form a firm engagement with the securing member; characterized by further comprising a washer having its outer wall portion engaged with the inner wall of the inclined lower end of the vertical bar and having its lower surface in line with the annular portion of the of the vertical bar so as to enlarge the area of the annular portion and improve the rigidity of the vertical bar in the inclined lower end thereof.

1 Claim, 3 Drawing Sheets

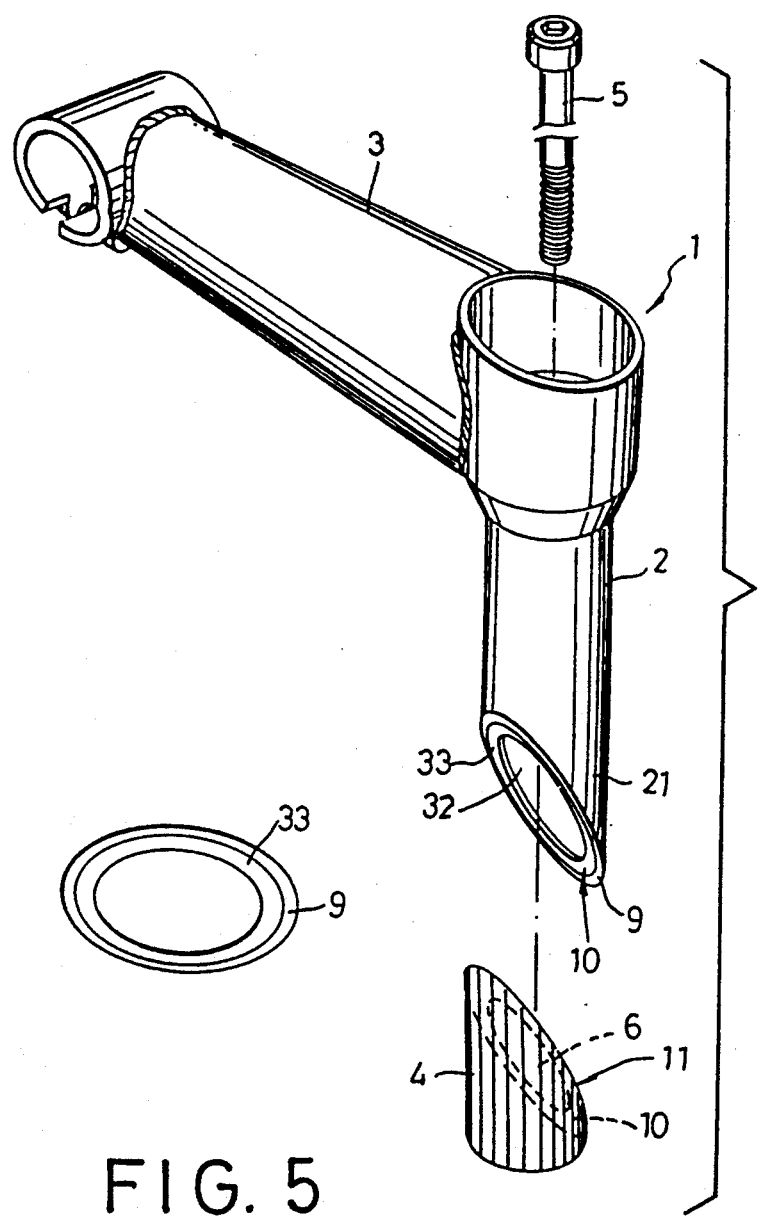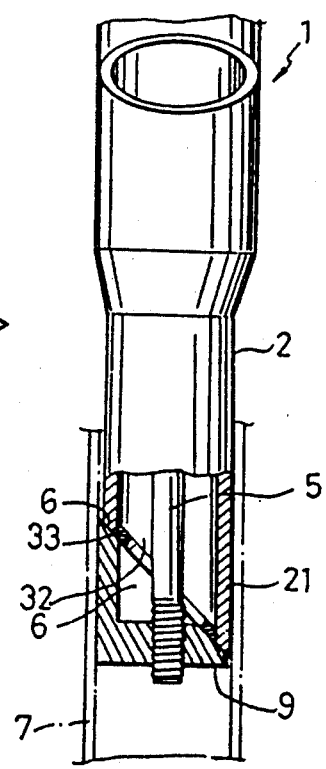
FIG. 5
FIG. 6

BICYCLE STEM MECHANISM HAVING INTERNAL RIGIDIFYING WASHER

This invention relates to an improved stem member, particularly to a stem member used in a bicycle.

The conventional stem member 1 (see FIG. 1) of a bicycle includes a vertical bar 2 with an inclined lower end 8, a bar member 3 attached to the upper end of the vertical bar 2, a securing member 4 with an inclined upper end 11 having a threaded hole 6 thereon and a bolt member 5. This bolt member 5 can be inserted into the vertical bar 2 and form a firm engagement with the securing member 4.

The assembling, the securing member 4 is firstly set into the fork member 7 (see FIG. 2), then the vertical bar 2 together with the bolt member 5 is placed into the form member 7 with its inclined lower end 8 seated onto the inclined upper end 11 of the securing member 4. As the bolt member 5 is rotated to pull these two member together, the side wall of vertical bar 2 and securing member 4 will be pushed separately toward the inner wall of the fork member 7 by the shearing force generated between the inclined plane. By this arrangement, this vertical bar 2 and form member 7 can be engaged firmly. However, such an arrangement still has the following defects.

1) In the principle of making the bicycle lighter, the thickness of the inclined lower end 8 is reduced and thus, it will deform as a shearing force is applied onto it.

2) Since the annular portion 9 of the vertical bar 2 is much narrower than the annular portion 10 of the securing member 4, hence the annular portion of the securing member 4 will easily be damaged by the sharp annular portion of the vertical bar 2, particularly when this securing member 4 is made of alloy, light but not rigid. This will bring a negative effect on the engagement of the vertical bar 2 and the fork member 7.

3) The annular portion 9 of the vertical bar 2 is too small to be seated onto the securing member 4. This is not appropriate for mass production.

Hence the object of this invention is to solve the problems encountered in the prior art.

A further object of this invention is to provide an improved stem member which provided an excellent rigidity for easier assembly of the vertical bar and the securing member.

A further object of this invention is to provide an improved vertical bar with a larger annular portion thus enabling ease of assembly and more appropriate for mass production.

In order to as to achieve the objects set forth above, this improved vertical bar includes a washer positioned inside the annular portion located in the inclined lower end of the vertical bar so as to enlarge the annular portion of the vertical bar in its inclined lower end and consequently provide a better rigidity to the inclined lower end.

Further objects, features, advantages and possible applications of this invention can be derived from the following description of illustrative embodiments with reference to the following drawings, wherein FIG. 1 is a exploded perspective view of the vertical bar of the prior art;

FIG. 4 is a perspective view illustrating a washer which has been fixed to the opening of the vertical bar according to this invention;

FIG. 5 is the surface of the washer and the annular portion of the vertical bar; and FIG. 6 is a cross-sectional view illustrating the vertical bar shown in FIG. 3 together with a fork member.

Figure 3:
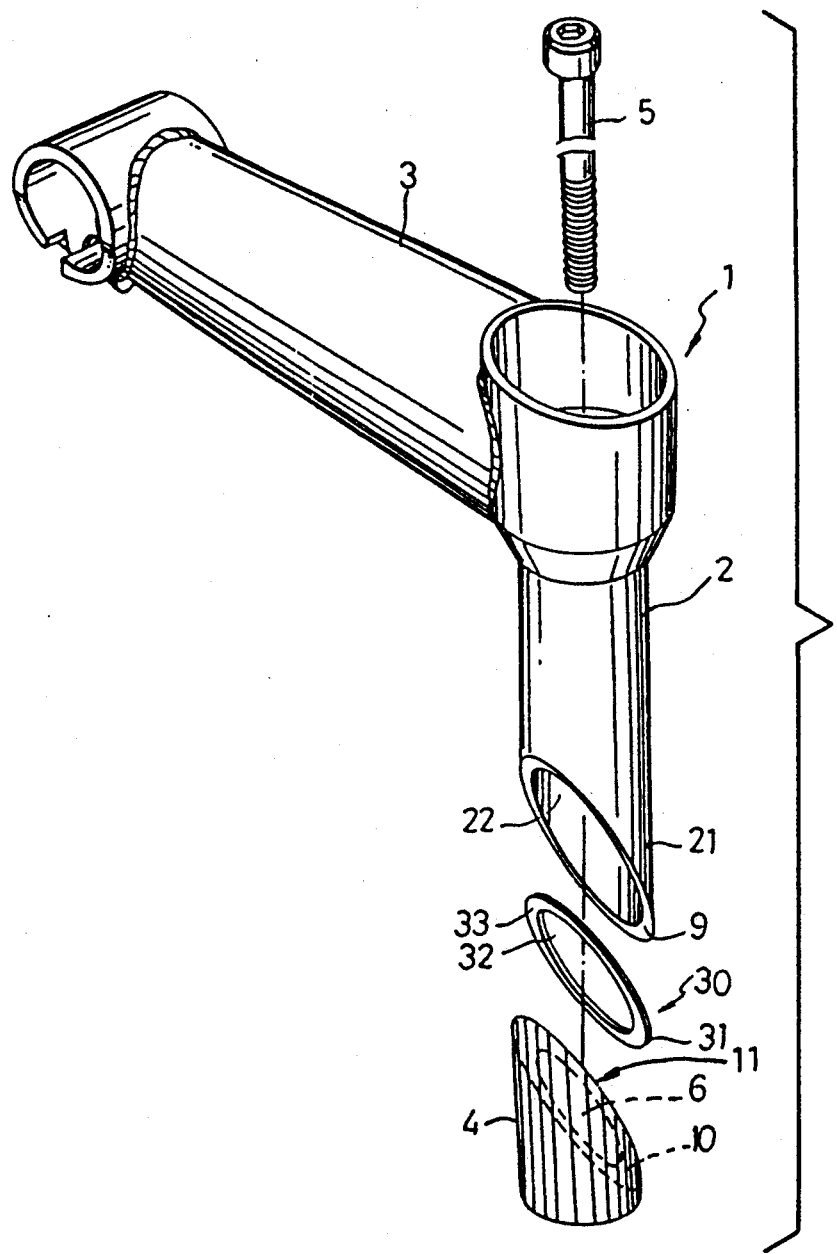
FIG. 3 is the exploded perspective view of the vertical bar according to this invention.

Referring to FIG. 3, 4 the improvement of this invention resides in that a washer 30 is fixed inside the annular portion 9 of the inclined lower end 21 of the vertical bar 2. This washer 30 is made of steel on the like. The washer 30 can be fitted completely within the annular portion 9 of the vertical bar 2. By engaging the outer wall 31 of the washer 30 entirely with the inner wall of the inclined lower end 21, the annular portion 33 of the washer 30 can be placed in line with the annular portion 9, thereby largely increasing the area of the annular portion 9 of the inclined lower end 21. The washer 30 has a hole 32 in the center portion thereby which provides a passage for the bolt member 5. As can be seen, the annular portion 33 of the washer 30 is wider than the annular portion 9 of the vertical bar 2, consequently the area of the annular portion 9 of the inclined lower end 21 of the vertical bar 2 is greatly increased.

As can be seen from FIG. 5, the annular portion 9 of the inclined lower end 21 has been greatly enlarged by the utilization of the washer 30.

As shown in FIG. 6, the area of the annular portion 9 of the inclined lower portion 21 has been significantly enlarged by the utilization of the washer 30. Therefore the annular portion 9 of the vertical bar 2 will not have any sharp edges which might damage the annular portion 10 of the securing portion 4 as the bolt member 5 is passed through the vertical bar 2 and hole 32 and is screwed into the threaded hole 6 of the securing member 4. During the assembly, the annular portion 10 will not be damaged by the annular portion 9. Not only will the annular portion 10 of the securing member 4 not be damaged by the annular portion 9 of the inclined lower end 21 of the vertical bar 2, but it will also provided a better engagement for the annular portion 9 of the vertical bar 2 and the annular portion 10 of the securing member 4.

Figures 1, 2:
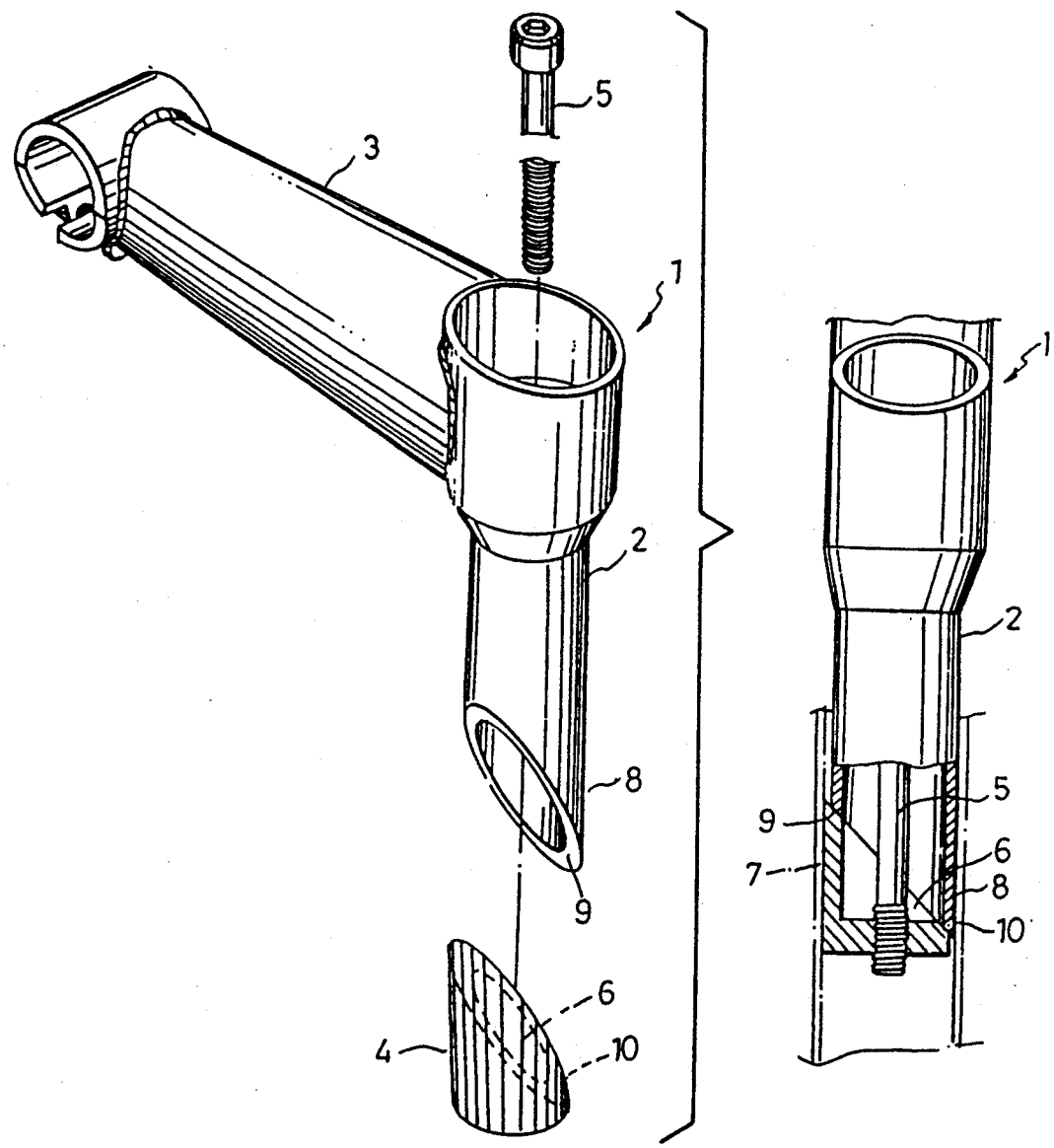
FIG. 2 is a cross-sectional view illustrating the vertical bar shown in FIG. 1 together with a fork member.

When the bolt member 5 provides a further axial force to pull the vertical bar 2 and securing member 4 together. A shearing force is generated between their contacting surface and thereby push the side wall of the vertical bar 2 and the securing member 4 against the inner wall of the fork member 7, see FIG. 2, which then provides firm engagement of the stem member with the fork member. As the washer 30 is arranged within the annular portion 9 of the vertical bar 2, the inclined lower end 21 of the vertical bar 2 becomes more rigid. In short, the inclined lower end 21 of the vertical bar 2 will not be deformed, and consequently the problems encountered in the prior art are solved.

I claim:

1. An improved stem mechanism for a bicycle comprising a vertical bar having an upper end and a lower end, said lower end being inclined to an axis of the bar extending between the upper and lower ends of the bar and presenting an annular portion at said lower end, said inclined lower end being capable of being inserted into a fork member of the bicycle with said annular portion inside said fork member;

a bar member connected to said upper end of said vertical bar;

a securing member having an inclined upper end with an annular portion thereon, said securing member being capable of being engaged firmly within said fork member and having a threaded passage generally aligned with the axis of said vertical bar;

a bolt member having a threaded portion, which can be inserted into said vertical bar and engaged with said securing member; and a washer lying within said inclined lower end of said vertical bar, said washer having an outer wall portion engaged with an inner wall of said inclined lower end of said vertical bar and having its lower surface aligned with said annular portion of said vertical bar so as to enlarge the area of said annular portion and to improve the rigidity of said vertical bar in the inclined lower end thereof.

* * * * *